United States Patent [19]
Thompson et al.

[11] 3,883,046
[45] May 13, 1975

[54] ELASTOMERIC BLADDER FOR POSITIVE EXPULSION TANK

[75] Inventors: Leo M. Thompson, Niagara Falls; Robert K. Anderson, Lockport; Lawrence H. Kocher, Tonawanda, all of N.Y.

[73] Assignee: Textron Inc., Providence, R.I.

[22] Filed: Feb. 11, 1974

[21] Appl. No.: 440,956

[52] U.S. Cl.................. 222/386.5; 150/1; 220/85 B; 222/95
[51] Int. Cl............................................ B65d 35/28
[58] Field of Search.................. 150/1, .5; 220/85 B; 222/95, 386.5

[56] References Cited
UNITED STATES PATENTS

| | | | |
|---|---|---|---|
| 2,283,439 | 5/1942 | Herman | 220/85 B |
| 3,067,810 | 12/1962 | Mozic | 222/386.5 X |
| 3,097,766 | 7/1963 | Biehl et al. | 222/386.5 X |
| 3,286,878 | 11/1966 | Schadt et al. | 220/85 B |
| 3,404,813 | 10/1968 | Waxman | 222/386.5 |
| 3,592,360 | 7/1971 | Aleck | 222/95 |
| 3,809,291 | 5/1974 | Purdy | 222/386.5 X |

*Primary Examiner*—Robert B. Reeves
*Assistant Examiner*—David A. Scherbel
*Attorney, Agent, or Firm*—Bean & Bean

[57] ABSTRACT

A positive expulsion tank is fitted with a solely end supported tubular bladder formed of elastomeric material; the bladder having an essentially relaxed as-fabricated configuration when the tank is partially filled and being tensioned only when assuming expanded or tank full and contracted or tank emptied configurations. Stretch controlling reinforcements may be incorporated within the bladder in order to maintain bladder elongation within acceptable limits and to selectively conform the surface of the inflated bladder to the contour of the inner surface of a tank.

8 Claims, 7 Drawing Figures

3,883,046

3,883,046

ELASTOMERIC BLADDER FOR POSITIVE EXPULSION TANK

BACKGROUND OF THE INVENTION

Positive expulsion tanks employing flexible or elastomeric bladders have for many years been employed to store flowable products, such as a liquid rocket propellant or other liquid supplies such as water. Conventionally, these tanks employ bladders formed of single or multiple plies of material, which are designed so that its as-fabricated size and shape approximates internal dimensions of the tank. However, while these bladders have demonstrated a high degree of reliability for single mission use in the aerospace program, they have several major functional life constraints, which limit their usefulness for multi-mission applications. These constraints include bladder failure from material fatigue and/or abrasion due to the rolling of bladder folds and creases during exposure to dynamic environments, and failure from bladder overstress during filling caused by bladder/tank shell frictional forces.

Prior to the development of bladders of the type described above, attempts were made to employ tensioned bladders within positive expulsion tanks. However, these attempts were unsuccessful for various reasons including the inability of available propellant compatible materials to undergo required degrees of expansion.

SUMMARY OF THE INVENTION

The present invention relates to improved bladder constructions for use in providing positive expulsion tanks of multiple mission capability.

In accordance with a preferred form of the present invention, a bladder formed of a stored product compatible elastomeric material has an as-fabricated tubular or cylindrical configuration. The bladder is end mounted within the tank on a centrally disposed diffuser assembly consisting of a pair of facing, axially spaced conically shaped members, which are apertured to permit the introduction and withdrawal of the product from the bladder, and a product transport tube, which serves to connect the apexes of the members and may, if desired, also be apertured. The ends of the bladder are secured, as by clamping, peripherally of the base of each of the conically shaped members, such that the bladder is essentially relaxed when it assumes its as-fabricated cylindrical configuration in which it is disposed concentrically outwardly of the transport tube. In this configuration of the bladder, it cooperates with the diffuser tube device to define a partial tank-full cavity. When filling the tank, the liquid product introduced into the bladder will initially fill this cavity and then serve to expand the bladder outwardly until it assumes a fully tensioned, tank-full configuration.

The tank is emptied by applying an expelling fluid, such as a gas, to the tank exteriorly of the bladder. During resultant discharge of stored product through the diffuser tube device, the bladder first returns to its essentially relaxed, as-fabricated cylindrical configuration and is thereafter again immediately tensioned as it is forced by the expelling fluid to assume a tank-empty configuration wherein it lies in conforming engagement with the surface of the diffuser tube device. Thus, for each product discharge cycle, the bladder is exposed to two tension modes, during which the elastic properties of the bladder prevents the formation of failure producing uncontrolled buckles and folds. Further, the design is such that the bladder is not subject to abrading contact with any constraint or guide throughout substantially the whole of its range of deformation.

Also, in accordance with the present invention, reliability of the bladder may be enhanced by incorporating a reinforcing cord matrix within the bladder material. The cord matrix serves to restrict bladder elongation to within acceptable limits to control the tank-full bladder configuration and to prevent localized failures, such as pin holes from progressing to a catastrophic tear.

The reinforcement matrix would preferably consist of a core filament about which a reinforcing cord is helically wound. The elongation of the core filament must be equal to or exceed that of the basic bladder material, so that it may accommodate for bladder elongation. On the other hand, the reinforcing cord straightens from its helical shape as the bladder expands and, at its final or developed length, must have sufficient strength to prevent elongation of the basic bladder material beyond design limits. As most materials having required physical characteristics for a reinforcement cord are not readily bonded, an adhesive system compatible with both the reinforcement cord and the bladder material must normally be used to effect bonding of the two. Finally, the reinforcement system is preferably encapsulated within a tie coat of elastomer, which has the capability of completely surrounding the reinforcement cord and has an elongation greater than the parent bladder material.

The geometric configuration or patterning of the reinforcement matrix will of course be dependent upon the degree of strain that different areas of the bladder are to be subjected during operation and during dynamic environment exposure.

DRAWINGS

DETAILED DESCRIPTION

Figure 1:
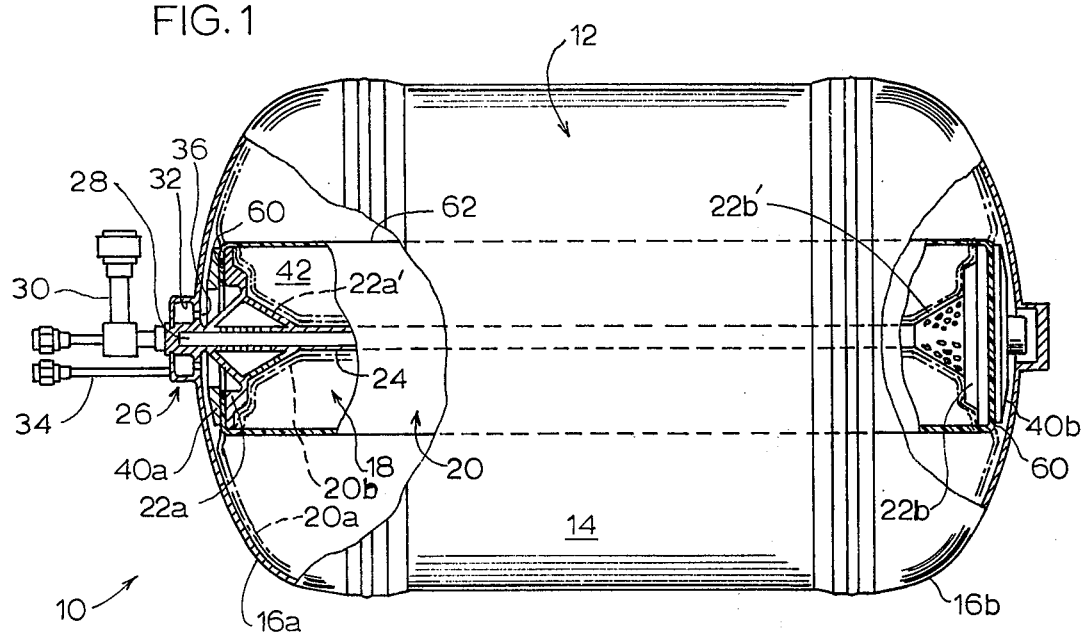
FIG. 1 is a partially sectionalized side elevational view of a generally cylindrical, positive expulsion tank incorporating the present invention.

A positive expulsion tank formed in accordance with the present invention is designated as 10 in FIG. 1. Tank 10 generally includes a tank shell 12 having an essentially cylindrical central portion 14 and rounded end portions 16a and 16b; a diffuser assembly or device 18; and a bladder 20. Depending upon design consideration, rounded end portions 16a and 16b may be hemispherical or ellipsoidal in nature.

Diffuser assembly 18 is shown as including a pair of hollow end members 22a and 22b, having apertured conically shaped surfaces 22a' and 22b' arranged in a facing axially spaced relationship and a diffuser tube 24, which is end connected to the apex portions of members 22a and 22b in order to place same in fluid flow communication and to provide a cantilever support for member 22b. It will be understood that the cylindrical wall of tube 24 intermediate members 22a and 22b may be solid or apertured, as desired, and that the base of member 22b is closed or solid.

Member 22a, and thus the whole of assembly 18, is supported within shell 12 by means of a fixture, generally designated as 26, which is in turn suitably fixed to extend through shell end portion 16a and the base of member 22a. As will be apparent from viewing FIG. 1, fixture 26 serves to define a product conduit opening 28, which extends through end wall portion 16a for placing diffuser assembly 18 in flow communication with a product entry or supply and withdrawal conduit 30; and to define a distributing cavity 32 arranged in flow communication with an expulsion fluid supply-exhaust conduit 34. Cavity 32 is placed in flow communication with the space between shell 12 and bladder 20 by one or more expulsion fluid openings 36 extending through end wall portion 16a and/or that portion of the shell end wall defined by fixture 26. If desired, assembly 18 may be modified by omitting tube 24 in which case member 22b would be mounted directly on tank shell end portion 16b.

In accordance with the preferred form of the present invention, bladder 20 is formed of a product compatible, resiliently deformable or elastomeric material and has an asfabricated tubular or cylindrical configuration. Bladder 20 is mounted centrally within tank shell 12 by diffuser assembly 18, such as by having its opposite ends clamped peripherally of the annular base of each of members 22a and 22b by suitably attached clamping rings 40a and 40b.

Figure 3:
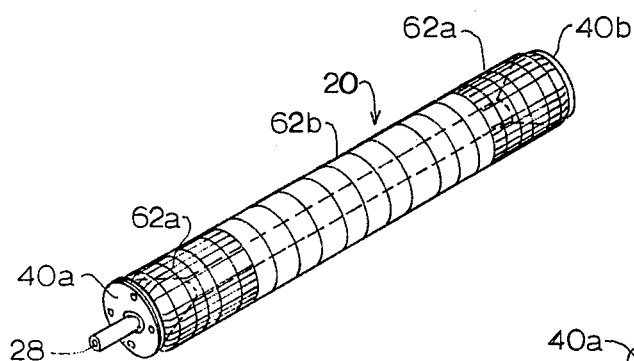
FIG. 3 is similar to FIG. 2, but showing the bladder in an essentially relaxed, tank-partially full configuration.

When bladder 20 is disposed in its as-fabricated cylindrical configuration, shown in FIGS. 1 and 3, it is in an essentially relaxed condition and cooperates with assembly 18 to define a partial tank-full liquid product cavity 42.

Figure 2:
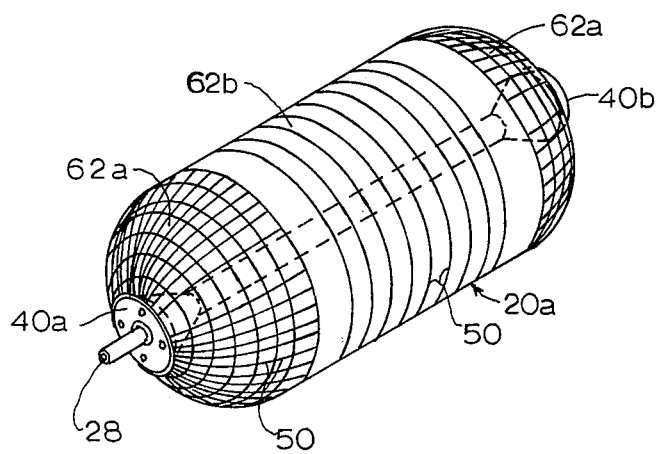
FIG. 2 is a perspective view of the bladder of the present invention in a tensioned, tank-full configuration.

When filling tank 10, product introduced into bladder 20 through conduit 30, will initially fill cavity 42 and then serve to expand or resiliently deform the bladder outwardly until it assumes a fully tensioned, tank-full configuration designated as 20a in FIGS. 1 and 2. During filling of bladder 20, conduit 34 would be connected to atmosphere. Bladder 20 essentially conforms to the interior surface configuration of tank shell 12 when in its tank-full configuration.

Figure 4:
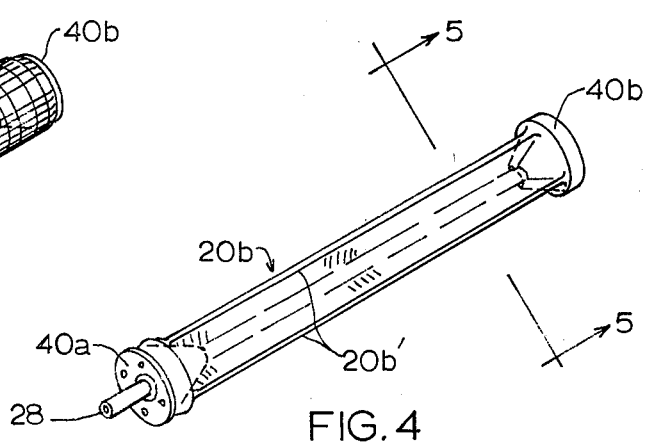
FIG. 4 is similar to FIG. 2, but showing the bladder in an exemplary tensioned, tank-empty configuration.
Figure 5:
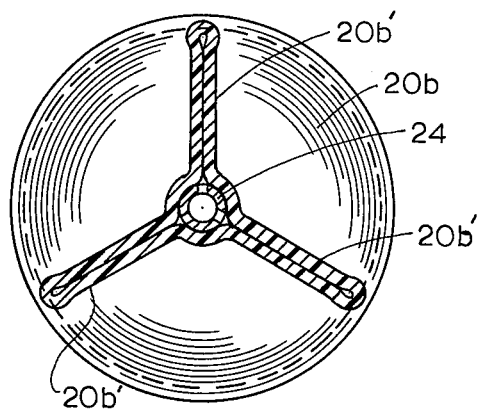
FIG. 5 is a sectional view shown in line 5—5 in FIG. 4.

Tank 10 may be emptied by applying a pressurized expelling fluid, such as gas, exteriorly of bladder 20 through conduit 34. During resultant discharge of stored product through conduit 30, the bladder first returns (resiliently contracts) to its as-fabricated cylindrical configuration, and then is again placed under tension as it is forced by the expelling fluid to resiliently deform into a tank-empty configuration, which is designated as 20b in FIGS. 1, 4 and 5, wherein it essentially lies in conforming engagement with the surface of assembly 18. During movement of the bladder into tank-empty configuration, its as-fabricated construction and mode of end support permits it to inherently assume some given cross-sectional configuration dependent upon the properties and thickness of the bladder material; an exemplary configuration being shown in FIGS. 4 and 5. Lengthwise extending portions of the bladder fold upon themselves to define two or more relatively uniformly shaped and annularly spaced ribs 20b'. The peripheral location of ribs 20b' tend to be random in nature with the angular spacing between such ribs being essentially uniform. This obviates the necessity of employing folding guides, which would reduce product storage volume efficiency and complicate the construction and add to the overall weight of the tank.

It is important to note that during each complete expulsion cycle, bladder 20 undergoes two distinct tension modes, during which the elastic properties of the bladder tends to prevent the formation of rolling single and double folds in the bladder material, and cooperates with the unobstructed internal design of the tank to minimize or prevent abrading engagement of the bladder with either the tank shell or the diffuser assembly. The as-fabricated diameter of the bladder relative to the internal diameter of the vessel shell, which determines the degree of biaxial tension to which the bladder is subjected during each tension mode, will as a practical matter, be determined by the requirement that the filled bladder approximate the configuration of the tank shell and the empty bladder fully collapse without having its material subject to excessive localized stress.

Figure 6:
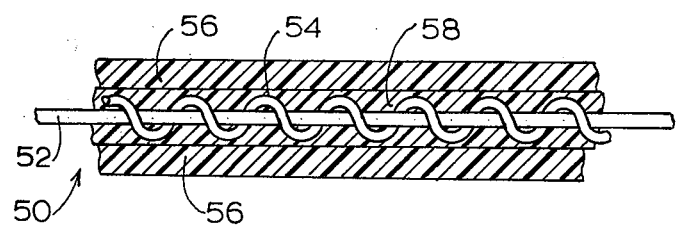
FIG. 6 is a sectionalized view showing a bladder reinforcement matrix.

In the preferred form of the present invention, bladder 20 incorporates a strain limiting, reinforcing matrix, which includes a plurality of reinforcing elements of the type generally designated as 50 in FIG. 6. Each of elements 50 includes a core filament 52, which serves as a convenient manufacturing carrier for a helically wound reinforcing cord 54. The extent of elongation of core filament 52 is required to be equal to or slightly in excess of the permissive elastic elongation of the basic bladder material, which may be laid up as plies 56. Reinforcing cord 54 is designed to straighten out from its helical shape as the bladder expands and, at its developed length, must have sufficient strength to prevent elongation of adjacent portions of plies 56 beyond design limits. As most materials having required physical characteristics for a reinforcing cord do not readily bond to parent elastomeric bladder materials, an adhesive system compatible with both the reinforcing cord and parent material, must normally be used to effect a bond therebetween. This system would preferably include a reinforcing system encapsulating tie coat of elastomer 58, which would have an elastic elongation greater than the parent bladder material. These characteristics are required to prevent voids in the matrix to the extent possible, and to minimize elongation of any minute voids which may exist.

The materials chosen for forming the parent bladder material and the reinforcing matrix will be dictated by their compatability with the particular product to be stored.

The geometric configuration or patterning of the reinforcing elements forming the matrix is dependent upon the degree of uniaxial and biaxial strain that different areas of the as-fabricated bladder will be subjected to in operation, as well as the required tank-full configuration of the bladder. For the illustrated bladder installation, the reinforcing matrix may be considered as being divided into three main areas, namely, the opposite annular end areas 60, shown only in FIG. 1, in which the bladder is clampingly attached to end members 22a and 22b; and an intermediate or as-fabricated cylindrical area 62, designated only in FIG. 1. In turn area 62 includes tank-full rounded end and cylindrical central portions 62a and 62b, respectively. In areas 60, it is desirable that the reinforcement be sufficiently strong to resist any stretching in order to prevent loss of strength and/or thinning thereof. However, area 62 must be capable of controlled, but non-uniform stretch in order to provide the illustrated tank-full bladder configuration. Specifically, the reinforcement elements must be laid and fabricated such that hoopwise stretch is essentially uniform within central portion 62b and progressively decreases within rounded end portions 62a to essentially zero at areas 60. On the other hand, axial stretch is preferably essentially uniform. While reinforcing elements 50 are only shown as running hoopwise within central portion 62b, it is contemplated that the matrix within the central portion may include axially running reinforcing elements.

Figure 7:
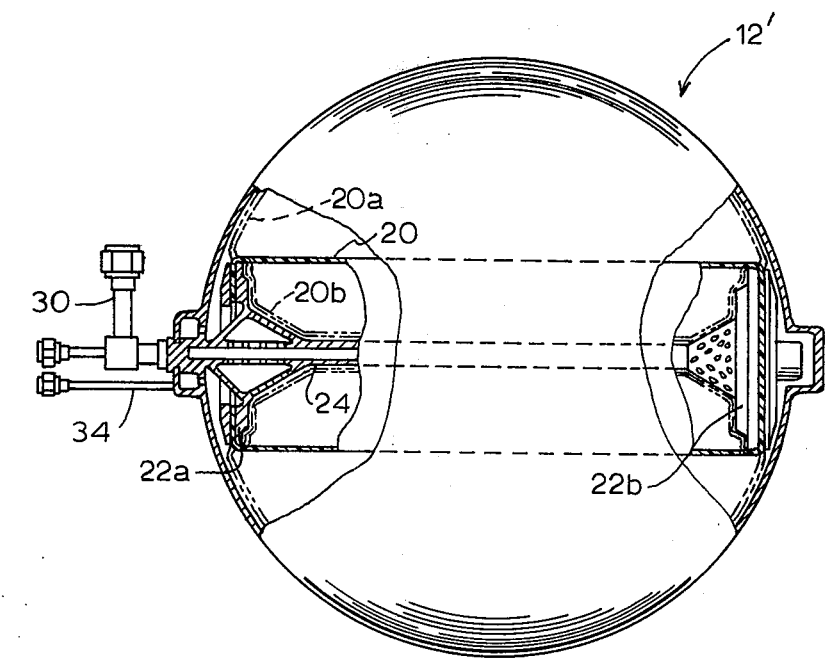
FIG. 7 is a view similar to FIG. 1, but showing a spherical tank configuration.

FIG. 7 illustrates the utilization of the present bladder construction in combination with a spherical tank shell 12'; the only difference being the patterning of bladder reinforcing matrix to omit previously described central section 62b.

We claim:

1. A positive expulsion tank comprising in combination:
   a tank shell having a product opening and an expulsion fluid opening;
   a bladder formed of a resiliently deformable material, said bladder having an as-fabricated cylindrical configuration; and
   a diffuser assembly fixed within said tank shell and to opposite ends of said bladder for mounting said bladder centrally within said tank shell such that said bladder is in an essentially relaxed condition when in said cylindrical configuration, said assembly cooperating with said bladder to define a product receiving cavity, said product opening being in flow communication with said cavity through said assembly, said expulsion fluid opening being in flow communication with said shell exteriorally of said bladder, and said bladder assuming a tensioned tank-full configuration wherein it closely conforms to said tank shell and a tensioned tank-empty configuration wherein it closely conforms to said assembly, characterized in that the portion of said bladder intermediate said opposite ends is unsupported and remains free of abrading contact with said tank shell and said assembly throughout substantially the whole of its range of deformation between said tank-full and tank-empty configurations.

2. A positive expulsion tank according to claim 1, wherein said diffuser assembly includes a pair of end members having facing essentially concically shaped surfaces, and said opposite ends of said bladder are fixed peripherally of each of said end members.

3. A positive expulsion tank according to claim 2, wherein said end members are rigidly interconnected and placed in flow communication by a conduit extending between facing apex portions thereof, and said conically shaped surfaces are apertured to afford flow communication between said product opening and said cavity.

4. A positive expulsion tank according to claim 1, wherein said tank shell has a cylindrical central portion and rounded end portions.

5. A positive expulsion tank according to claim 1, wherein said tank shell is of essentially spherical configuration.

6. A positive expulsion tank according to claim 1, wherein said bladder incorporates a reinforcing matrix for preventing stretch of said bladder material beyond its elastic limit and for variably controlling biaxial expansion of axially spaced portions of said bladder disposed intermediate said opposite ends whereby to pattern said bladder to closely conform to the configuration of said tank shell when in said tank-full configuration.

7. A positive expulsion tank comprising in combination:
   a tank shell;
   means defining a stored product opening and an expulsion fluid opening;
   a bladder formed of a resiliently deformable material, said bladder having an as-fabricated cylindrical configuration;
   means for fixedly supporting opposite ends of said bladder such that said bladder is disposed centrally within said tank shell and in an essentially relaxed condition when in said cylindrical configuration, said supporting means closing said opposite ends and placing the interior of said bladder in flow communication with said product opening whereby stored product may be introduced into and discharged from within said bladder, said stored product when introduced into said bladder sequentially filling said bladder and thereafter resiliently expanding said bladder to assume a tank-full configuration wherein said bladder is under tension and closely conforms to an inner surface of said tank shell, said expulsion fluid opening being in flow communication with the interior of said tank shell outwardly of said bladder for admitting expulsion fluid into said tank shell to force said stored product from within said bladder outwardly through said product opening whereby to sequentially return said bladder to said cylindrical configuration and thereafter resiliently deform said bladder to assume a tank-empty configuration wherein said bladder is under tension and substantially all of said stored product is expelled therefrom, characterized in that the portion of said bladder intermediate said opposite ends is unsupported and remains free of abrading contact with said tank shell and said supporting means throughout substantially the whole of its range of deformation between said tank-full and tank-empty configurations.

8. A bladder for use in a positive expulsion tank having a given shell configuration, characterized as having an as-fabricated cylindrical configuration with annular attachment areas at opposite ends of an intermediate area, said bladder being formed of a resiliently deformable material and incorporating a reinforcing matrix, said matrix being patterned to prevent stretch deformation of said attachment areas and to provide for nonuniform biaxial stretch characteristics within said intermediate area whereby to permit said bladder intermediate area to be resiliently deformed radially from said cylindrical configuration to assume a tank-full configuration corresponding to said shell configuration.

* * * * *